（12）United States Patent
Baker

(10) Patent No.: US 10,328,446 B2
(45) Date of Patent: Jun. 25, 2019

(54) INTERNAL QUENCH SYSTEM FOR COOLING PIPE

(71) Applicant: Shawcor Ltd., Toronto (CA)

(72) Inventor: Brian Baker, Calgary (CA)

(73) Assignee: Shawcor, Ltd., Toronto, ON (CA)

( * ) Notice: Subject to any disclaimer, the term of this patent is extended or adjusted under 35 U.S.C. 154(b) by 122 days.

(21) Appl. No.: 15/363,176

(22) Filed: Nov. 29, 2016

(65) Prior Publication Data
US 2018/0117628 A1  May 3, 2018

(30) Foreign Application Priority Data

Nov. 3, 2016 (CA) ...................... 2947367

(51) Int. Cl.
| B05B 13/06 | (2006.01) |
| B05C 9/14 | (2006.01) |
| B05D 7/14 | (2006.01) |
| B05C 5/02 | (2006.01) |
| C21D 1/667 | (2006.01) |
| C21D 9/08 | (2006.01) |
| F27D 9/00 | (2006.01) |
| B05D 3/00 | (2006.01) |
| B05C 13/00 | (2006.01) |
| B29C 35/16 | (2006.01) |
| B29L 23/00 | (2006.01) |

(52) U.S. Cl.
CPC ........ *B05B 13/0627* (2013.01); *B05C 5/0241* (2013.01); *B05C 9/14* (2013.01); *B05D 7/146* (2013.01); *C21D 1/667* (2013.01); *C21D 9/085* (2013.01); *F27D 9/00* (2013.01); *B05C 13/00* (2013.01); *B05D 3/007* (2013.01); *B05D 2254/02* (2013.01); *B29C 35/16* (2013.01); *B29C 2035/1616* (2013.01); *B29L 2023/22* (2013.01)

(58) Field of Classification Search
CPC ....... B05C 9/14; B05C 5/0275; B67D 1/0867; B67D 1/0857; B05D 7/146; B05B 13/0267
See application file for complete search history.

(56) References Cited

U.S. PATENT DOCUMENTS

| 4,050,963 A | * | 9/1977 | Kunioka | ................ C21D 9/085 148/510 |
| 4,214,470 A | * | 7/1980 | Hurst | ........................ B21C 1/14 72/286 |
| 4,655,280 A | * | 4/1987 | Takahashi | ........... B29C 45/7312 164/348 |
| 6,270,847 B1 | | 8/2001 | Wong et al. | |

(Continued)

*Primary Examiner* — Karl Kurple
(74) *Attorney, Agent, or Firm* — Gregory L. Porter; Hunton Andrews Kurth LLP

(57) ABSTRACT

An internal quench system for cooling pipes being coated is provided. The system comprises an internal quench lance having spray nozzles configured at one end of the internal quench lance. There is also provided wheels and retractable supports to support the internal quench lance without hindering the movement of the pipes. Each retract support is provided with a liquid coolant supplying means to provide liquid coolant to the internal quench lance. A process for using the internal quench system for cooling pipes being coated is also provided.

12 Claims, 10 Drawing Sheets

(56) References Cited

U.S. PATENT DOCUMENTS

| | | | | |
|---|---|---|---|---|
| 6,407,360 | B1* | 6/2002 | Choo | B23K 26/046 219/121.67 |
| 6,916,502 | B2* | 7/2005 | Moore | B05B 14/10 427/236 |
| 7,182,909 | B2* | 2/2007 | Rabinovich | C21D 1/56 148/647 |
| 2004/0032274 | A1* | 2/2004 | Cader | G01R 1/0458 324/750.08 |
| 2005/0012250 | A1* | 1/2005 | Rabinovich | C21D 1/56 266/46 |
| 2007/0218198 | A1* | 9/2007 | Moore | C23C 4/12 427/236 |
| 2012/0103052 | A1* | 5/2012 | Ueoka | B21B 45/0233 72/342.2 |
| 2013/0092108 | A1* | 4/2013 | Mehring | F01M 5/001 123/41.72 |
| 2016/0320282 | A1* | 11/2016 | Dingman | G01N 23/12 |

* cited by examiner

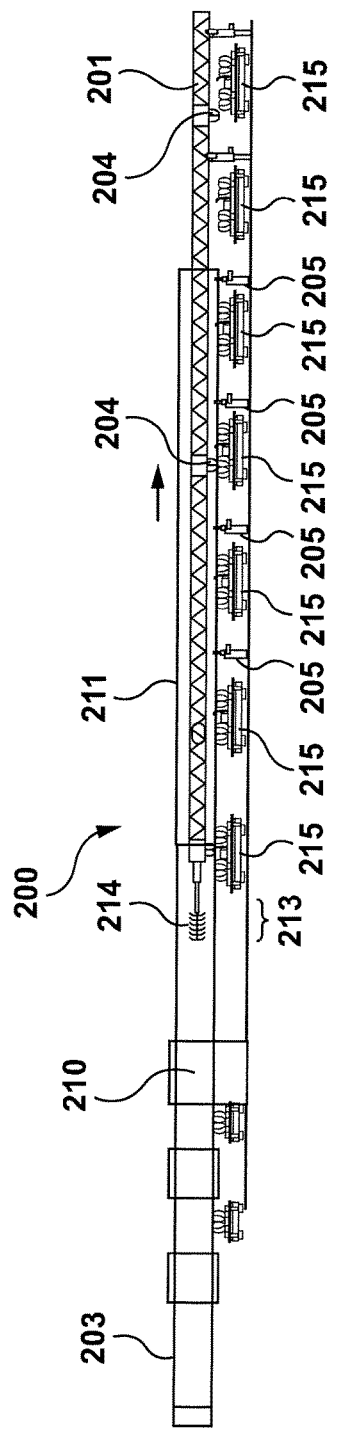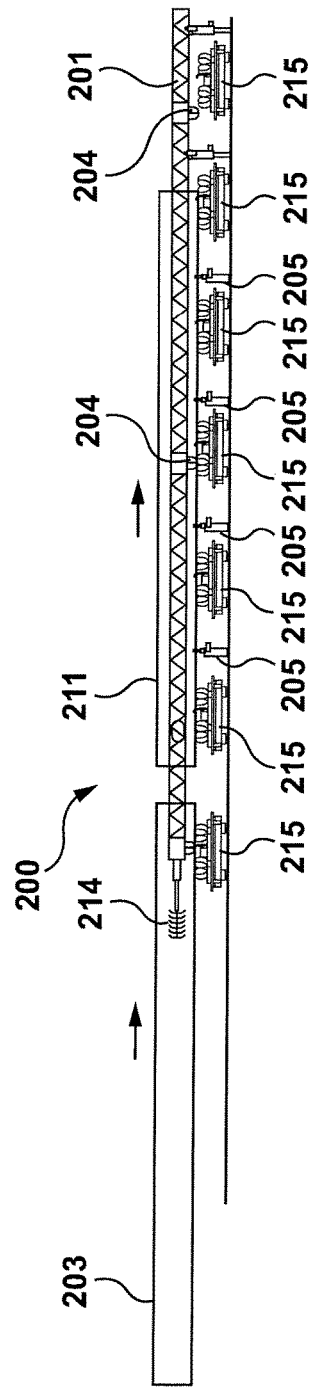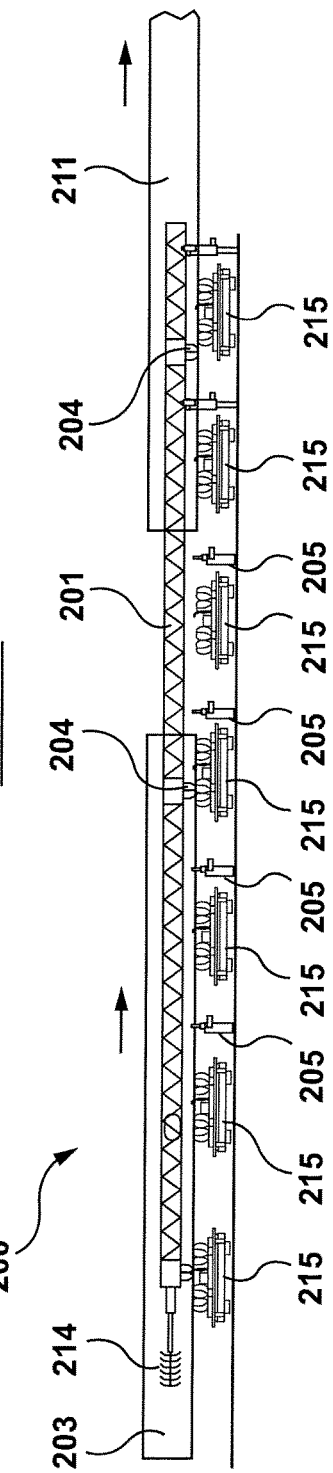

INTERNAL QUENCH SYSTEM FOR COOLING PIPE

FIELD OF THE INVENTION

The invention relates to the art of cooling pipes. In particular, the invention relates to the art of cooling a coating after its application onto a pipe length.

BACKGROUND

In the manufacture of coated pipes, a typically metal pipe is heated to a high temperature and polymeric material is applied as a powder or extruded onto the external surface of the pipe. The polymeric material is or becomes molten and conforms to the pipe surface. Usually, the pipe is spun or rotated about its axis. After sufficient time has elapsed for flow and/or curing to occur, the material is cooled to solidify it and to prevent damage during further handling. Damage can occur if the still molten coating comes into contact with equipment used to transport it such as supporting rollers on a conveying line.

There are numerous known processes for cooling the molten coating. In most processes, the cooling is carried out by flooding the outside surface with cold water using pipes having many open or spray nozzle, with the process lasting until the polymeric material has reached the predetermined temperature. These processes are laden with problems, specifically in relation to obtaining a defect free coating, in particular in pipes that have raised weld profiles. This is likely at least in part due to shrinkage when the coating solidifies, as well as the order in which the different regions solidify.

Solidification of the polymeric material on the outer surface first produces a skin layer which is highly stressed in tension while not yet bonded to the pipe surface. If the skin layer has a defect such as a pinhole or bubble, this becomes the weakest point and the coating can tear at this position. Where there is a concave curvature on the surface, such as at a neck area of a weld, the tension in the skin layer causes it to pull away from the pipe surface. In the meantime, the molten polymeric material at the pipe surface is creating pinholes and cavities to replace the displaced material. The cavities in the coating at the neck of the weld, which are referred to as tenting, can run for considerable distances along the weld length. On a convex surface, such as on the top of a weld, the still molten material under the solidified skin can be squeezed away to produce a coating thinner than specified when the coating solidifies entirely.

To overcome some of the disadvantages of solidification of the outer surface first, alternative processes have been developed for cooling pipes being coated with hot plastic, comprising applying a liquid cooling medium to the interior surface of the pipe. Internal cooling has numerous advantages. For example, the material at the pipe surface is solidified first, which promotes better adhesion to the surface, and minimizes frozen-in stresses at the interface. Internal cooling also reduces damage at defects, and decreases or eliminates tenting at the weld areas. Having a solidification front move from the pipe-coating interface towards the outer surface of the coating exposed to the air provides an unhindered process resulting in low coating stress. Interior cooling provides improvements in uniformity of coating thickness and increased efficiency of heat transfer. Methods and apparatus for internal cooling of pipes are described, for example, in the Applicant's U.S. Pat. No. 6,270,847, incorporated herein by reference. These include procedures and apparatus using a fixed lance, and a self propelled cart.

In some prior art, a fixed lance may be connected from the outside of the pipe by means of a travelling lance connected to a strong flexible hose which also supplies the water. Wheels support the lance on the inside of the pipe. At the end of the lance is a set of nozzles; the lance is held stationary while the pipe is rotating and moving forward, resulting in a coating solidification front which is stationary relative to the position where the coating is applied. However, use of a travelling lance has several disadvantages, including the need for added factory floor space for the removal of the travel lance at the time each coated pipe length is removed from the assembly line.

BRIEF SUMMARY OF THE INVENTION

This disclosure provides a system for internal quenching of pipes being coated. The system comprises a series of retractable supports for supporting the internal quench lance and supplying liquid coolant to the internal quench lance. The internal quench lance comprises wheels disposed along the length of the internal quench lance rotating freely on the interior surfaces of the pipes. The internal quench lance is longer than the pipes to be cooled.

According to certain aspects of the present invention is provided an internal quench system for cooling pipes that are being coated, comprising: an internal quench lance, comprising a plurality of liquid coolant receiving means; a plurality of retractable supports for supporting the internal quench lance, wherein each retractable support is configured with a liquid coolant supplying means for connecting with the liquid coolant receiving means to supply a liquid coolant to the internal quench lance.

According to certain embodiments, wherein the internal quench lance comprises a plurality of conduits.

According to certain embodiments, the conduits are of the same length.

According to certain embodiments, each conduit comprises a section configured with a plurality of spray nozzles.

According to certain embodiments, the sections are offset from each other along the lengths of the conduits.

According to certain embodiments, the sections are disposed at the ends of the conduits.

According to certain embodiments, the conduits are of different lengths.

According to certain embodiments, each conduit comprises a section configured with a plurality of spray nozzles.

According to certain embodiments, the sections are configured at the ends of the conduits.

According to certain embodiments, the internal quench system further comprises a valve, configured in the liquid coolant supplying means.

According to certain embodiments, the valve is a solenoid valve.

According to certain embodiments, actuated valve and a check valve is configured in the liquid coolant receiving means or the liquid coolant supplying means.

According to certain embodiments, the actuated valve is programmed to open when the internal quench lance and the retractable support are securely engaged.

According to certain embodiments, the retractable support is provided with at least one clamping mechanism.

According to certain embodiments, the clamping mechanism is driven by at least one power source.

According to certain embodiments, the power source is hydraulic, pneumatic, or electrical.

According to certain embodiments, the internal quench lance also comprises wheels disposed along the length of the internal quench lance.

According to certain embodiments, the wheels are configured to be in contact with the inner surface of the pipes when the internal quench lance is inside the pipes.

According to certain embodiments, the wheels provide support to the internal quench lance when the wheels are inside the pipes.

According to certain embodiments, the retractable supports are disposed along the length of the internal quench lance.

According to certain embodiments, the liquid coolant supplying means is a nozzle.

According to certain embodiments, the liquid coolant receiving means is a connector.

According to a further aspect of the invention is provided a process for using the internal quench system as herein described to cool pipes that are being coated, comprising: depositing coating on external surfaces of the pipes, wherein the pipes are in close proximity; transporting the pipes toward the internal quench system, wherein the end of the internal quench lance configured with the spray nozzles are closest to the pipes; spraying a liquid coolant from the spray nozzles onto inner surfaces of the pipes; supporting the internal quench lance with the wheels inside the pipes and the retractable supports; accelerating the movement of the lead pipe having liquid coolant sprayed therein, creating a gap between this pipe and the trailing pipe having liquid coolant sprayed therein; reducing the speed of the first pipe having liquid sprayed therein to maintain a substantially constant gap between the first pipe having liquid coolant sprayed therein and the second pipe having liquid coolant sprayed therein, wherein the gap is wide enough to accommodate at least two retractable supports; removing the first pipe having liquid coolant sprayed therein after the pipe passes the length of the internal quench lance; repeating steps a-g; wherein the retractable supports retract and extend in a cascading fashion to both support the internal quench lance, to allow the movement of the pipes and to supply liquid coolant to the internal quench lance.

According to certain embodiments, the liquid coolant is water.

According to certain embodiments, the pipes are transported by a conveyor system.

According to certain embodiments, the pipes are being rotated while being transported.

According to certain embodiments, the pipes are 60 feet long.

BRIEF DESCRIPTION OF THE DRAWINGS

Reference will now be made, by way of example, to the accompanying drawings which show example embodiments of the present application, and in which:

FIG. 2A-2C illustrate the internal quench system and process of the current invention.

DESCRIPTION OF EXAMPLE EMBODIMENTS

Figure 1A:
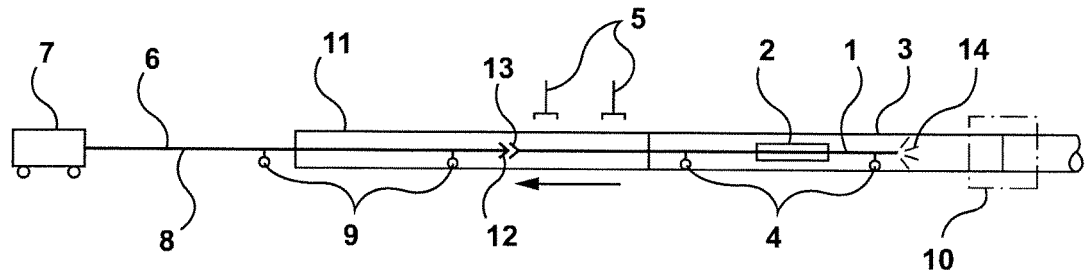
FIGS. 1A-1E illustrate a conventional internal quench system and process.

In various examples, the present disclosure describes an internal quench system and the method of use thereof. The system and the components therein may be of various sizes suitable for different pipes.

FIGS. 1A-1E illustrate a conventional internal quench system and the method of use thereof.

The conventional internal quench system comprises a stationary internal quench lance 1 and a travel lance subsystem 6. Wheels 4 are disposed along the length of the internal quench lance 1, wherein the wheels 4 are configured to be in contact with the internal surfaces of the pipes when the wheels 4 are inside the pipes, providing support to the internal quench lance 1.

The internal quench lance 1 has a zone at one end, wherein spray nozzles 14 are configured in this zone to spray water onto the internal surfaces of the pipes. The spray nozzles 14 are so arranged to optimize water/pipe contact and facilitate evaporative cooling. The other end of the internal quench lance 1 is configured with a connector 13 to receive connection from the travel lance 8 that supplies water.

The internal quench lance 1 also comprises a pressure tank 2. In some embodiments, the pressure tank 2 is disposed away from either end of the internal quench lance 1. In some embodiments, the pressure tank 2 may supply water to the spray nozzles 14 when there is no other water supply connected to the internal quench lance 1.

The internal quench system also comprises a travel lance subsystem 6, which is capable of moving. The travel lance subsystem 6 comprises a high torque drive system 7 with aggressive acceleration/deceleration zones. The high torque drive system 7 is controlled by a motion control system that maintains precise control of the position of the travel lance 8 throughout the operation of the internal quench system. The travel lance subsystem 6 further comprises a side carriage (not shown) with articulating support arms that may swing, catch and support the travel lance 8. Wheels 9 are disposed along the length of the travel lance 8, and the wheels 9 are in contact with the internal surfaces of the pipes to support the travel lance 8 while the travel lance 8 is disposed inside the pipes.

One end of the travel lance 8 is connected to the high torque drive system 7. The other end of the travel lance 8 is configured with a connector 12 that is capable of connecting to the connector 13 of the internal quench lance 1 to provide fluid connection so that water may be supplied to the internal quench lance 1.

The internal quench system further comprises overhead clamp arms 5, which are capable of supporting the internal quench lance 1.

During operation, the pipes are continuously coated in a coating booth 10 and transported, while being rotated, by a conveyer through the coating booth 10 toward the internal quench system. The ends of the pipes are very close to or in contact with each other. In some embodiments, the ends of the pipes are connected with each by a sleeve type coupling.

The pipes gradually enclose the internal quench lance 1 therein, starting from the end of the internal quench lance 1 having the spray nozzles 14. The spray nozzles 14 continuously spray water onto the inner surfaces of the pipes. The first pipe that encloses the internal quench lance 1 is hereinafter referred to as a lead pipe 11 and the pipe after the lead pipe 11 is hereinafter referred to as a trailing pipe 3. The internal quench lance 1 is supported by the wheels 4 disposed along its length once the wheels 4 are in contact with the inner surfaces of the pipes. The wheels 4 are configured to both support the internal quench lance 1 and allow the pipes to rotate freely while moving linearly away from the coating booth 10.

As shown in FIG. 1A, while the pipes move along, the lead pipe 11 moves closer to the drive system 7 of the travel lance subsystem 6, enclosing the connection between the travel lance 8 and parts of the travel lance 8 and the internal quench lance 1 therein. The travel lance 8 is supported by the wheels 9 disposed along its length when the wheels 9 are in contact with the inner surfaces of the pipes. The wheels 9 are configured to both support the internal quench lance 1 and allow the pipes to rotate freely while moving linearly away from the coating booth 10.

Figure 1B:
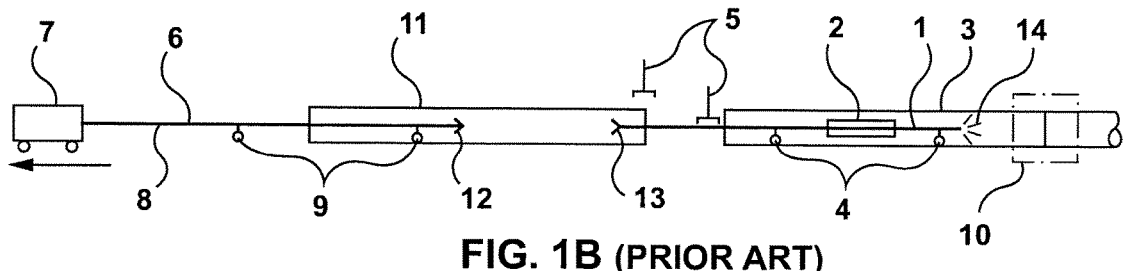

FIG. 1B shows that the movement of the lead pipe 11 then accelerates to form a gap between the lead pipe 11 and the trailing pipe 3. While the gap widens, an overhead clamp arm 5 lowers to engage the end of the internal quench lance 1 exposed outside of the pipes to provide support. The connection between the travel lance 8 and the internal quench lance 1 disengages, and the travel lance subsystem 6 moves away from the internal quench lance 1. Once the connection between the travel lance 8 and the internal quench lance 1 disengages, the pressure tank 2 may supply liquid coolant to the internal quench lance 1 so that the cooling of the trailing pipe 3 is not interrupted.

Figure 1C:
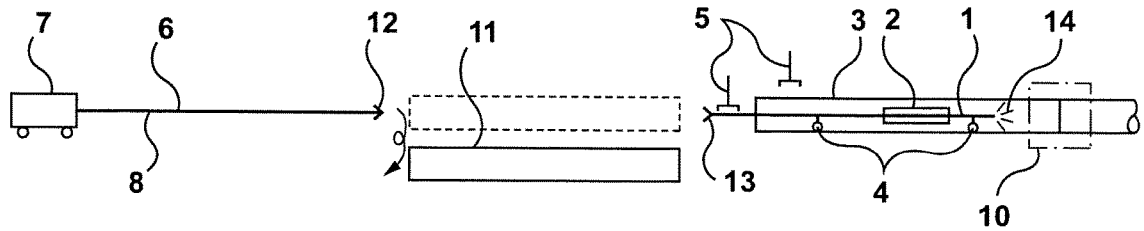

FIG. 1C shows a big enough gap forms between the travel lance 8 and the internal quench lance 1 to allow the lead pipe 11 to exit and the lead pipe 11 is then removed from the conveyer. The travel lance 8 is supported by the articulating support arms from the side carriage. The trailing pipe 3 keeps moving, and the overhead clamp arm 5 that supports the internal quench lance 1 retracts to allow further movement of the trailing pipe 3, while an overhead clamp arm 5 further away from the coating booth 10 lowers to support the internal quench lance 1.

Figure 1D:
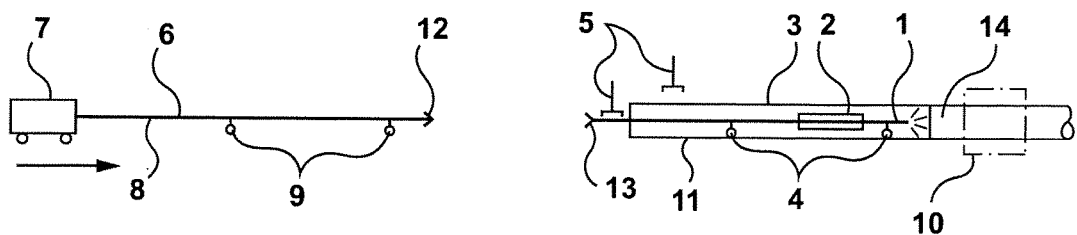

FIG. 1D shows the travel lance subsystem 6 moves toward the internal quench lance 1 after the removal of the lead pipe 11. After the removal of the lead pipe 11, the trailing pipe 3 has now become the new lead pipe 11.

Figure 1E:
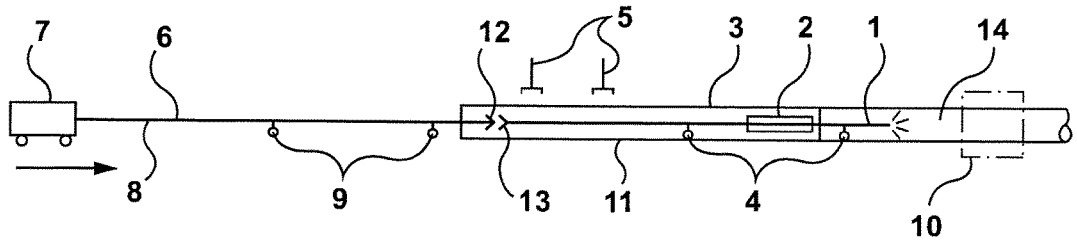

FIG. 1E shows that the travel lance subsystem 6 moves until the connector 12 at one end of the travel lance 8 is next to the connector 13 at the end of the internal quench lance 1 distal from the coating booth 10. The two connectors 12 and 13 are then pneumatically clamped to ensure that the travel lance 8 and the internal quench lance 1 are aligned, the connection is leak-free and capable of properly charge the pressure tank 2 and maintain water flow for pipe cooling.

Once the connection is established, water is supplied from the travel lance 8 to the internal quench lance 1.

As the pipes move along, the supporting overhead clamp arm 5 retracts to allow further movement of the lead pipe 11 to enclose a portion of the travel lance 8. The pipe exiting from the coating booth 10 following the lead pipe 11 is now trailing pipe 3. The end of the lead pipe 11 proximal to the coating booth 10 is next to the end of the trailing pipe 3 distal from the coating booth 10.

The process described above then repeats to continually cool the pipes being coated.

FIGS. 2A-2C illustrate the internal quench system of the current invention and the method of use thereof.

A quench conveyor system, which includes multiple sections 215 arranged along the moving direction of the pipes, is used to transport the pipes exiting the coating booth 210. In preferred embodiments, the sections 215 are four wheel sections.

The internal quench system 200 comprises retractable supports 205 that are fixedly attached at one end to the ground. The retractable supports 205 may extend in length to engage the internal quench lance 201 to support the internal quench lance 201. In preferred embodiments, the retractable supports 205 are disposed in an alternating fashion with the sections 215. The retractable supports 205 may retract or extend by any suitable means known in the field. In some embodiments, a pneumatic system is provided within a retractable support 205 to extend and retract the retractable support 205.

The internal quench system 200 also comprises an internal quench lance 201. The internal quench lance 201 may extend longitudinally into the interior of the pipes. The internal quench lance 201 has a zone 213 at its end proximal to the coating booth 210. In some embodiments, the zone 213 is the tip of the internal quench lance 201. In preferred embodiments, the zone 213 spans a length of the end of the internal quench lance 201. In some embodiments, the length may be changed depending on the conditions of the cooling operation and the cooling specification.

A plurality of spray nozzles 214 are disposed in the zone 213 to spray liquid coolant onto the inner surfaces of the pipes 211 and 203. In some embodiments, the liquid coolant is pressurized. In preferred embodiments, the liquid coolant is water.

The internal quench system also comprises wheels 204. The wheels 204 are disposed along the length of the internal quench lance 201. The wheels 204 are so configured that when the internal quench lance 201 is enclosed in the pipes 203 and 211, the wheels 204 are in contact with the inner surfaces of the pipes and provide support to the internal quench lance 201.

FIG. 2A shows the cooling process wherein the lead pipe 211 fully exited the coating booth 210 and the trailing pipe 203 has partially exited the coating booth 210. The end of the lead pipe 211 proximal to the coating booth 210 is very close to or in contact with the end of the trailing pipe 203 close to the lead pipe 211. In some embodiments, the ends of the lead pipe 211 and the trailing pipe 203 are connected with each other by a sleeve type coupling.

As the pipes 211 and 203 are transported by the quench conveyor system, the pipes gradually enclose the internal quench lance 201 therein, starting from end having the zone 213. In some embodiments, the pipes are being rotated while being transported.

Once the pipes start to enclose the internal quench lance 201, liquid coolant is sprayed from the spray nozzles 214 to cool the pipes. The spray may be continuous or intermittent, depending on the application. The internal quench lance 201 is supported by the wheels 204 in contact with the inner surfaces of the pipes and the retractable supports 205 that are not directly below the pipes.

As shown in FIG. 2B, as soon as the lead end of the trailing pipe 203 has become supported on the first conveyor section 215, the lead pipe 211 and the trailing pipe 203 decouple and the movement of the lead pipe 211 accelerates to create a gap between the lead pipe 211 and the trailing pipe 203. As the pipes continue to move, the gap widens. When the gap reaches a suitable width, the speed of movement of the lead pipe 211 is reduced to be the same as the trailing pipe 203, thus maintaining the gap at a substantially constant width. The gap may be maintained at a width sufficient to allow the succeeding retractable supports 205 to raise and engage with the lance before the preceding support has to disengage and lower from the lance.

When the pipes move, the retractable supports 205 retract and extend in a cascading fashion, so that the internal quench lance 201 is always supported by at least one of the retractable supports 205 and the wheels inside the pipes and the movement of the pipes are not hampered by the retractable supports 205. Eventually, the lead pipe 211 moves past the retractable support 215 that is farthest from the coating booth, and the lead pipe 211 is then removed from the conveyor system. In some embodiments, the conveyor system is provided with conveyor kickers to kick off the lead pipe 211.

Liquid coolant is supplied to the internal quench lance 201 through the retractable supports 205. Each retractable support 205 is provided with an attachment means for securely engaging the internal quench lance 201 with the retractable support 205. In some embodiments, the attachment means is a clamp head assembly.

In some embodiments, a liquid coolant supplying means is configured in each attachment means. In some embodiments, the liquid coolant supplying means is a nozzle. In some embodiments, the internal quench lance 201 is provided with liquid coolant receiving means, corresponding to the liquid coolant supplying means of the retractable supports 205. In some embodiments, the liquid coolant receiving means are connectors, each connector corresponding with a nozzle in the retractable supports 205. When a retractable support 205 is supporting the internal quench lance 201, the attachment means attach to the internal quench lance 201, and the liquid coolant supplying means connect to the liquid coolant receiving means of the internal quench lance 201.

Figure 3:
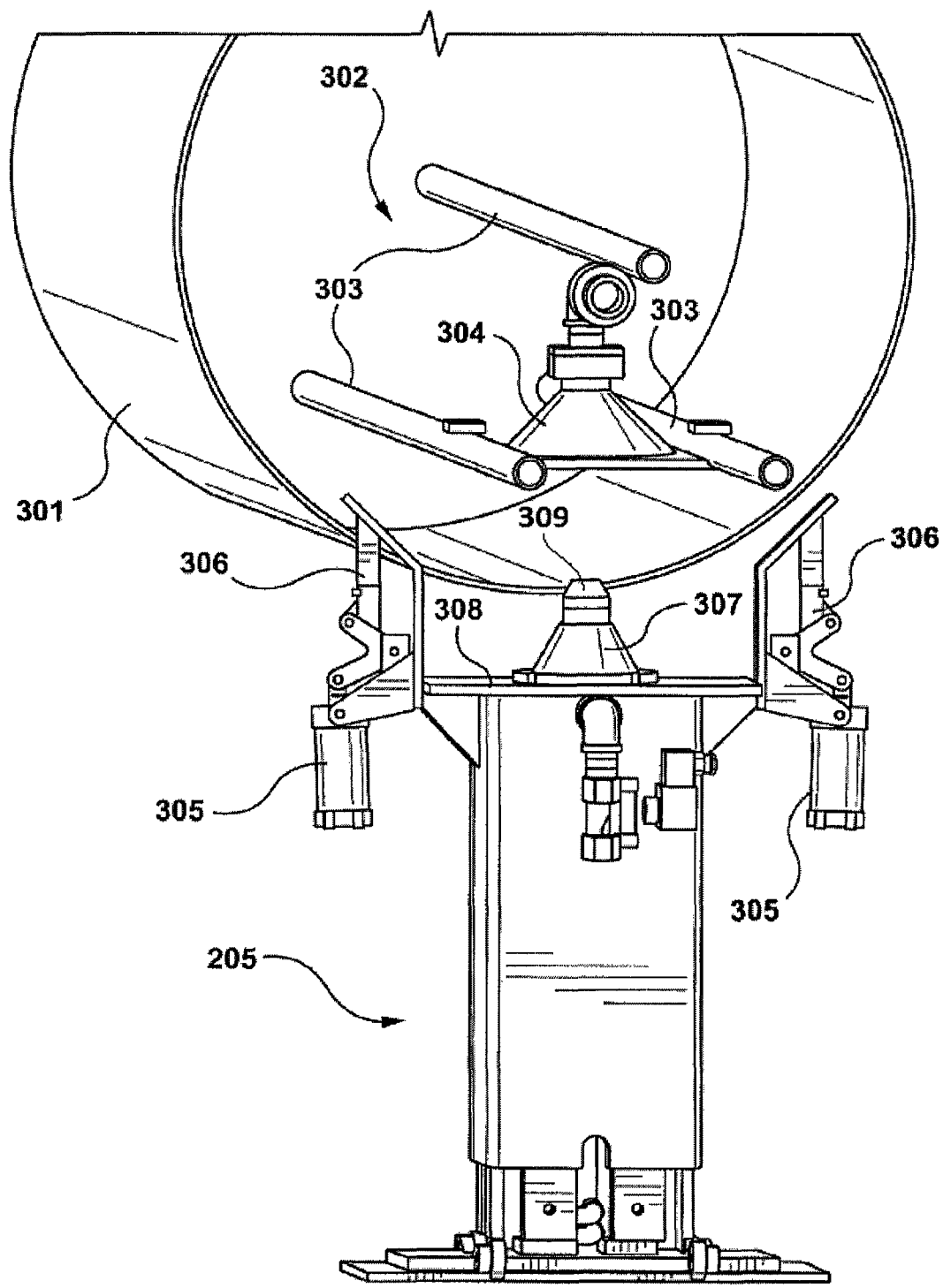
FIG. 3 shows a perspective view of a retractable support and an internal quench when they are disconnected.

In some embodiments, a valve is provided in the liquid coolant supplying means or the liquid coolant receiving means, and the valve opens when the connection between the liquid coolant supplying means and the liquid coolant receiving means is secure. In some embodiments, the valve is a solenoid valve 309 (FIG. 3). It is understood that any suitable liquid coolant supplying means and liquid coolant receiving means known in the field may be used.

In some embodiments, an arrangement of actuated valves and check valves may also be provided in the supplying means and/or the receiving means. When the retractable support 205 has clamped onto the quench lance 201 an actuated valve is programmed to open and supply water to the lance. When the receding retractable support 205 is signalled to disengage and lower, the actuated water valve is signalled to close and a check valve in the lance prevents water from backwashing out.

During the whole process, the coating at the coating booth 210 continues, and pipes exit the coating booth one after another. After removal of the lead pipe 211, the trailing pipe 203 becomes the new lead pipe 211, and the pipe exiting the coating booth 210 right after the new lead pipe 211 is the new trailing pipe 203, as shown in FIG. 2A. The process then repeats to continually cool the pipes being coated.

It is appreciated that the internal quench lance 201 may comprise multiple conduits, each conduit having a section with spray nozzles configured therein. In some embodiments, the conduits may be of different lengths. In some embodiments, the conduits may be of the same length. In some embodiments, the sections having the sprays nozzles may be disposed at the same distance from the coating booth. In some embodiments, the sections may be offset.

Figure 2D:
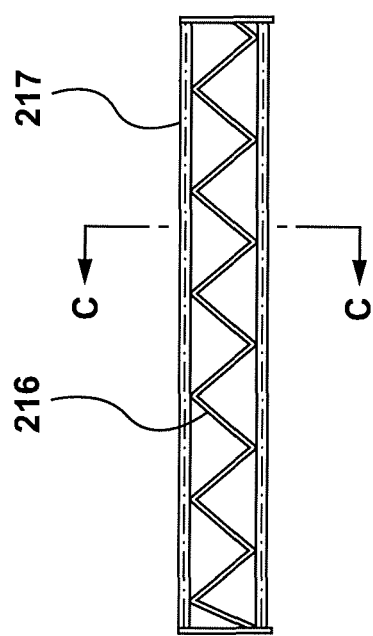
FIG. 2D shows one embodiment of the structure of the internal quench lance.
Figure 2E:
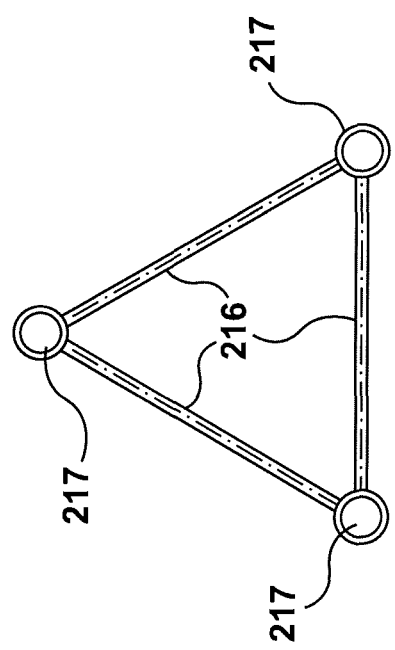
FIG. 2E shows the C-C section view of the structure of FIG. 2D.

In some embodiments, the internal quench lance 201 comprises a structure comprising multiple rods along the length of the conduit, wherein the rods are connected to each other by connecting rods, and the conduit(s) is supported within the structure. The connecting rods may be at an angle to the length of the rods and one end of each of the succeeding connecting rods connects to the same point on the rods. One embodiment of the structure is shown in FIG. 2D, wherein the rods 217 are connected to each other by the connecting rods 216, while the connecting rods 216 next to each other connect to the same spot on the rods 217. FIG. 2E, the C-C section view of the structure shown in FIG. 2D, shows the structure defining a space to accommodate the conduit (not shown). In some embodiments, the rods 217 may be conduits having spray nozzles configured thereon and there may or may not be a conduit or conduits within the space defined by the rods 217 and the connecting rods 216. It is understood that there may be more or fewer rods 217 and the structure may have different shape from the triangle shown in FIG. 2E.

Reference is now made to FIGS. 3-9, which illustrate one embodiment of the connection mechanism between the retractable support 205 and the internal quench lance 302.

In FIG. 3, the retractable support 205 is separate from the internal quench lance 302.

A clamping mechanism 306 is configured on the upper portion of the retractable support 205 to hold the internal quench lance 302 and the retractable support 205 together.

The clamping mechanism 306 may be driven by any suitable means known in the field. In some embodiments, a power source 305 is provided to supply mechanical force to the clamping mechanism 306. In some embodiments, the power source 305 provides hydraulic force to the clamping mechanism. In some embodiments, the power source 305 may be an electrical motor that provides force to the clamping mechanism 306. In some embodiments, the power source 305 provides pneumatic force to the clamping mechanism. It is understood there may be one or more clamping mechanisms 306 configured on a retractable support 205 as needed, with each clamping mechanism 306 configured with a power source 305. In some embodiments, each clamping mechanism 306 may be configured with more than one power source 305. In some embodiments, one power source 305 may be configured to drive more than one clamping mechanism 306.

Figure 5:
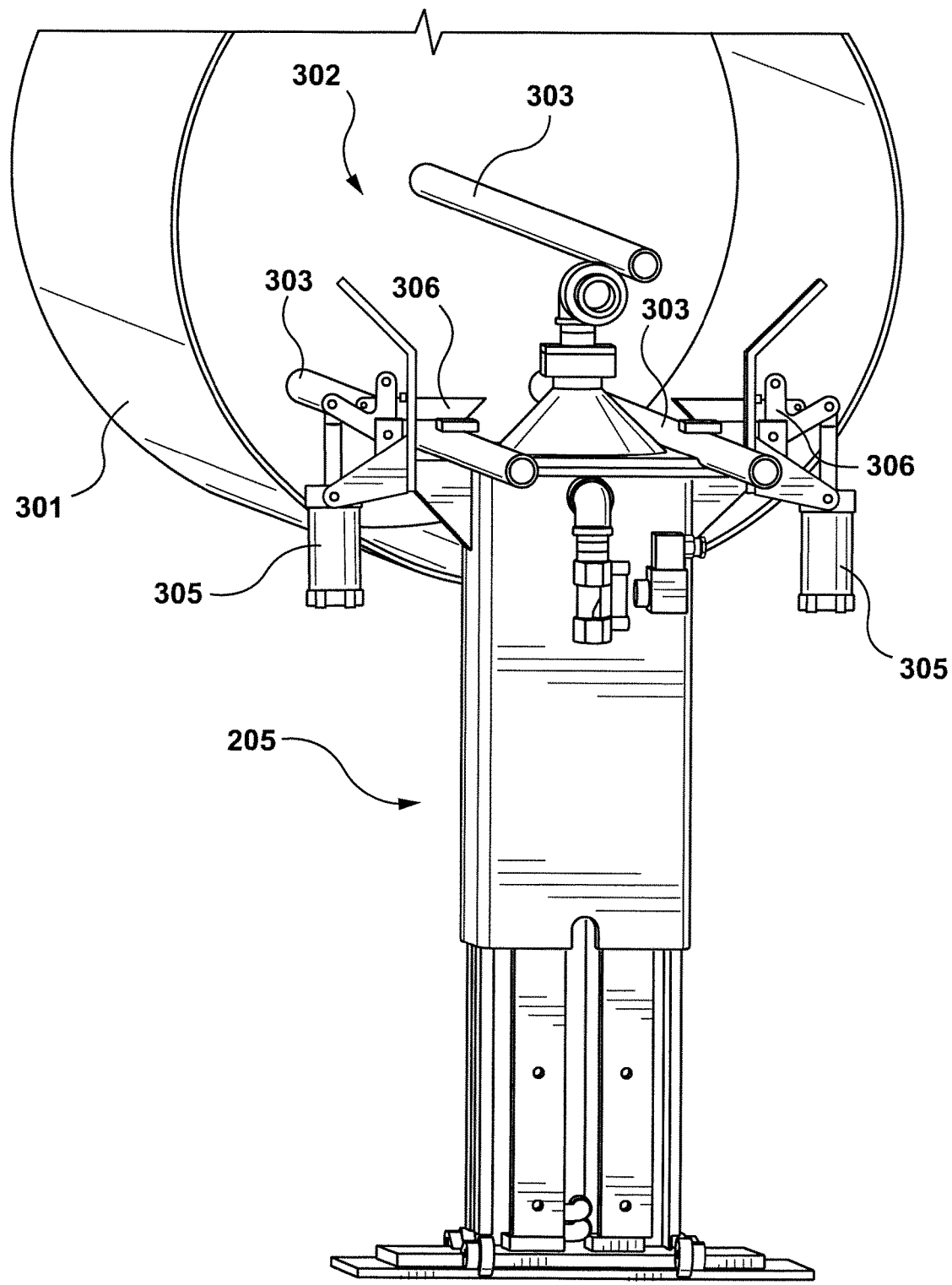
FIG. 5 is a perspective view of a retractable support and an internal quench lance held together.

The clamping mechanism 306 is attached to the power source 305 by any suitable means known in the field. For example, one end of the clamping mechanism 305 may be attached to the power source by bolt and nut. In some embodiments, the clamping mechanism 306 comprises a rigid piece of material with an axis of rotation so that when a force is provided to the rigid piece by the power source 305, the rigid piece rotates to press down on a part of the internal quench lance 302. Although FIG. 5 shows that the claming mechanism 306 clamps down on the rods 303, it is appreciated that the clamping mechanism 306 may be configured to clamp on other portions of the internal quench lance 302. In some embodiment, a pad-like structure may be configured on the rods 303 for the clamping mechanism 306 to clamp onto.

In the embodiment shown in FIGS. 3-9, the clamping mechanism 306 is attached to a part of the retractable support 205 at one point. This point of attachment also functions as an axis of rotation and divides the clamping mechanism into an upper part and a lower part.

The lower part of the clamping mechanism 306 is attached to the power source 305. Preferably, the lower part of the clamping mechanism 306 is attached to the power source 305 at a point close to the lower end of the clamping mechanism 306. In preferred embodiments, the clamping mechanism 306 is rotatably attached to the power source 305. It is appreciated that any suitable clamping means known in the field may be used. One example is Destaco pneumatic clamp #868.

In some embodiments, the retractable support 205 may be configured with a platform 308. In preferred embodiments, the platform 308 is substantially planar.

The internal quench lance 302 is provided with receptacles 304 to receive liquid coolant from the retractable support 205, each receptacle 304 corresponding to one retractable support 205. The retractable support 205 is provided with a mechanism 307 for supplying liquid coolant. In some embodiments, the mechanism 307 protrudes from the platform 308. In some embodiments, the mechanism 307 is substantially cone-shaped, with the tip cut off and replaced with a cylindrical structure having a smaller cone configured on top of the cylindrical structure. The smaller cone also has its tip cut off. An opening may be configured on the top end of the smaller cone for liquid coolant to flow out of. It is understood that the mechanism 307 may be configured in any suitable way known in the field.

The receptacle 304 is correspondingly configured to receive the mechanism 307 to provide a sealed connection when the mechanism 307 and the receptacle 304 are properly connected. For example, when the mechanism 307 is cone-shaped, the receptacle may be configured with a cone-shaped cavity to receive the mechanism 307. The receptacle 304 may be configured with an enlarged bottom that is shaped substantially corresponding to the platform 308. Thus, the retractable support 205 may provide supporting force to the internal quench lance 302 by pushing the platform 308 against the enlarged bottom of the receptacle 304.

In some embodiment, at least one elastic gasket may be provided in either the mechanism 307 or the receptacle 304 to prevent leakage. The elastic gasket may be made of rubber, silicone, TPE, or any other suitable material known in the field. In some embodiments, a seal tape may be used between the mechanism 307 and the receptacle 304. The seal tape may be made of PTFE.

In the embodiment shown in FIG. 3, the internal quench lance 302 comprises three rods 303. It is understood that the internal quench lance 302 may comprise more or fewer rods. In some embodiments, the rods 303 are conduits having spray nozzles. In some embodiments, the rods 303 are structural elements similar to those as shown in FIGS. 2D and 2E, having conduit(s) with spray nozzles disposed within the space defined by the rods 303. In some embodiments, the rods 303 are conduits having spray nozzles, and conduit(s) are disposed within the space defined by the rods 303.

Once the liquid coolant enters the internal quench lance 302 through the receptacle 304, the liquid coolant is distributed to the conduits of the internal quench lance 302. For example, there may be a water hose that connects the receptacle 304 to the conduits. In some embodiments, there may be a water hose that connects all the receptacles 304 in a daisy chain.

It is appreciated that the platform 308, the mechanism 307 and the receptacle 304 may be configured in any suitable way known in the field. In some embodiments, there may be configured multiple platforms 308 in the upper part of retractable support 205. Correspondingly, there may be provided multiple pads on the bottom of the internal quench lance 302. In some examples, the platforms 308 may be supported by spring-like structure to ensure support and to absorb vibration.

Figure 4:
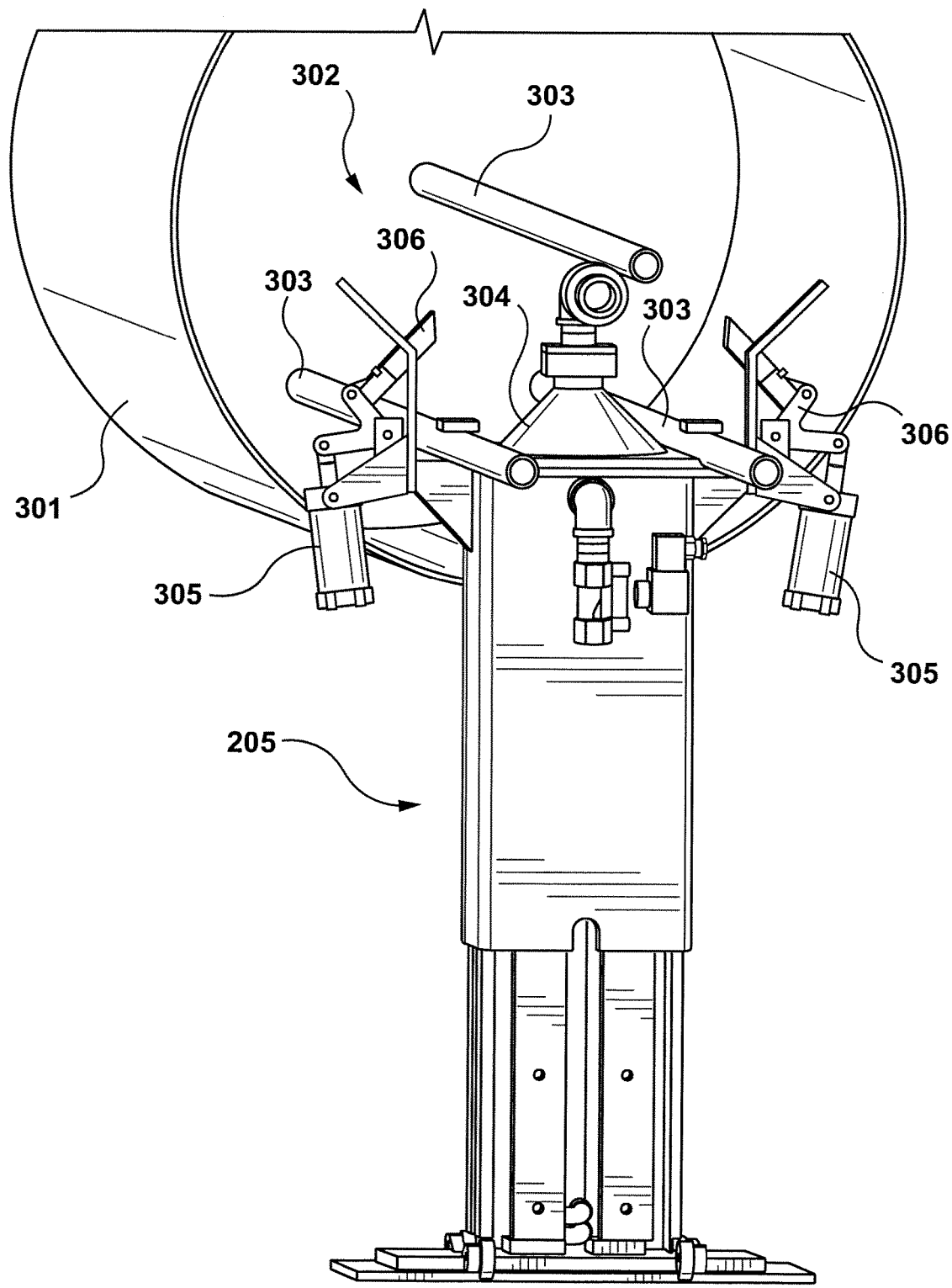
FIG. 4 is a perspective view of a retractable support supporting the internal quench lance, wherein a clamping mechanism is in the process of clamping the internal quench lance to the retractable support.

FIG. 4 shows that the retractable support 205 has extended to be in contact with the internal quench lance 302 and the clamping mechanism 306 is in the process of clamping down the internal quench lance 302. The mechanism 307 is received in the receptacle 304. The power source 305 provides a force to push the clamping mechanism 306, the lower part of the clamping mechanism 306 rises, forcing the clamping mechanism 306 to rotate about the axis, i.e., the point of attachment to the retractable support 205. The clamping mechanism 306 rotates, with the lower part moving outwardly and upwardly, and the upper part of the clamping mechanism 306 moving inwardly and downwardly. It is understood that the clamping mechanism may be any suitable configuration in the field.

FIG. 5 shows the retractable support 205 supporting the internal quench lance 302 securely. The clamping mechanism 306 has rotated so that the upper part of the clamping mechanism 306 presses firmly on the internal quench lance 302.

In some embodiments, a valve may be provided in the mechanism 307. The valve opens when the connection between the retractable support 205 and the internal quench lance 302 is secure. In some embodiments, the connection is considered secure when a certain amount of force is exerted by the clamping mechanism 306 on the internal quench lance 302. In some embodiments, a sensor may be provided to measure the force exerted. In some embodiments, sensor(s) may be disposed in the outer surface of the mechanism 307 or the clamping mechanism 306 to ascertain that the connection therebetween is secure. In some embodiments, the valve may be a check valve.

When the retractable support 205 needs to be disconnected from the internal quench lance 302, a force is supplied from the power source 305 to the clamping mechanism 306 to pull the lower part of the clamping mechanism 306. The clamping mechanism 306 then rotates, with the upper part moving upwardly and outwardly, and the lower part moving downwardly and inwardly. The movement continues until the clamping mechanism 306 reaches a position that when the retractable support 205 retracts, the clamping mechanism 306 would not interfere with the internal quench lance 302.

Figure 6:
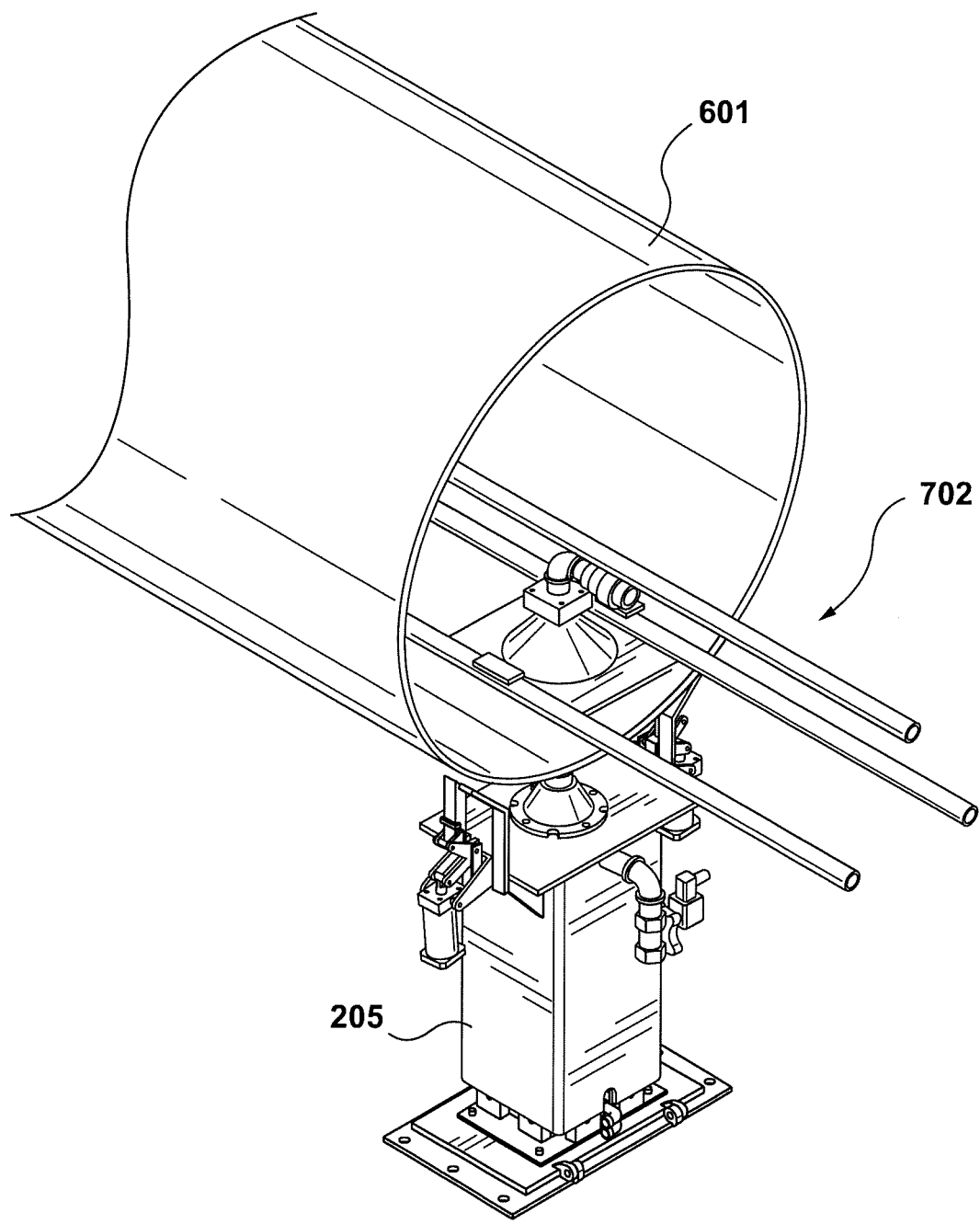
FIG. 6 is a perspective view of a pipe passing between the retractable support and the internal quench lance.

FIG. 6 shows a pipe 601 passing between the internal quench lance 602 and the retractable support 205. In order for the pipe 601 to pass through, the retractable support 205 retracts, leaving a gap between the retractable support 205 and the internal quench lance 602.

Figure 7:
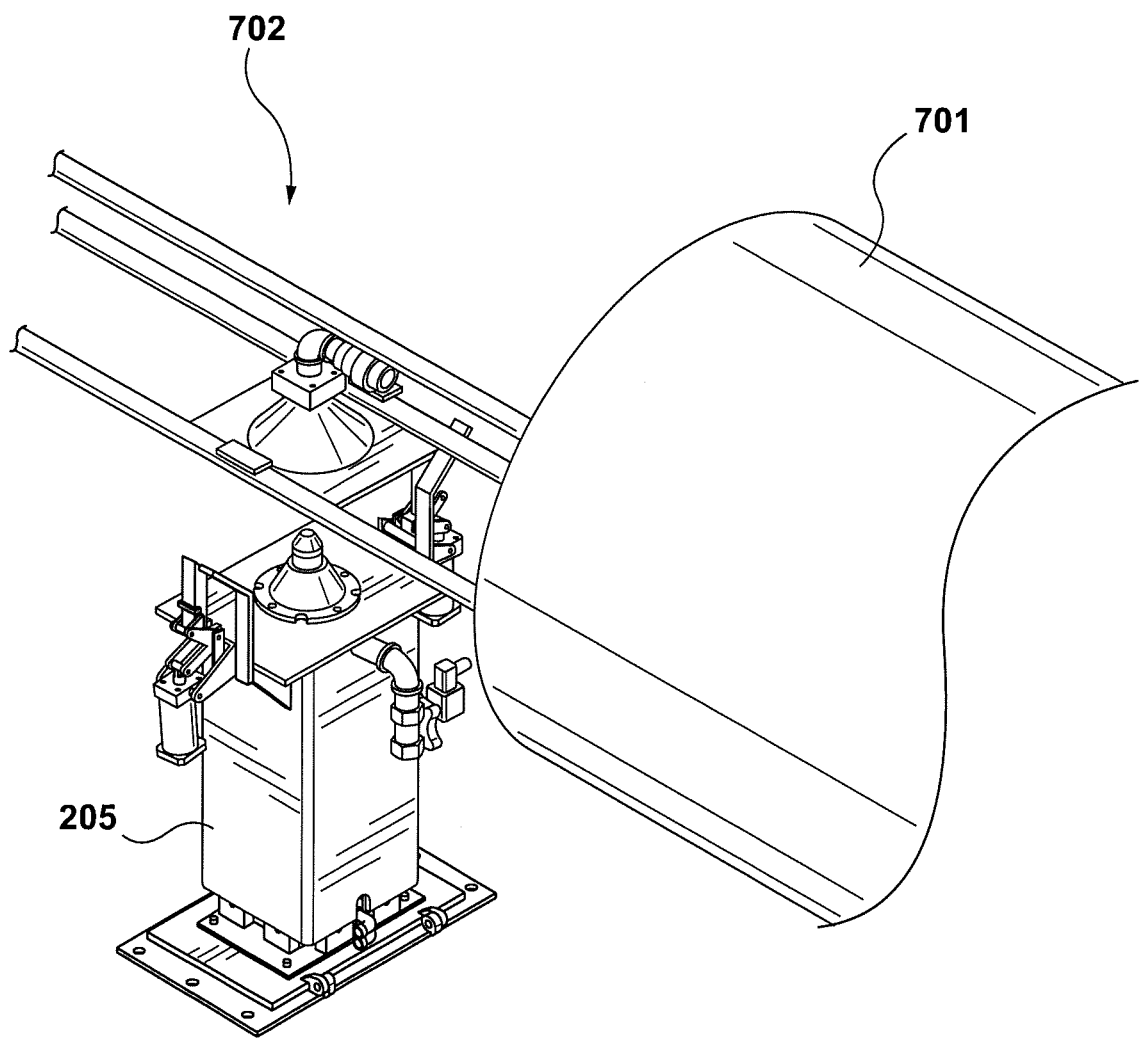
FIG. 7 is a perspective view of a pipe passing along the internal quench lance.

FIG. 7 shows the pipe 701 after it passes between the retractable support 205 and the internal quench lance 702.

Figure 8:
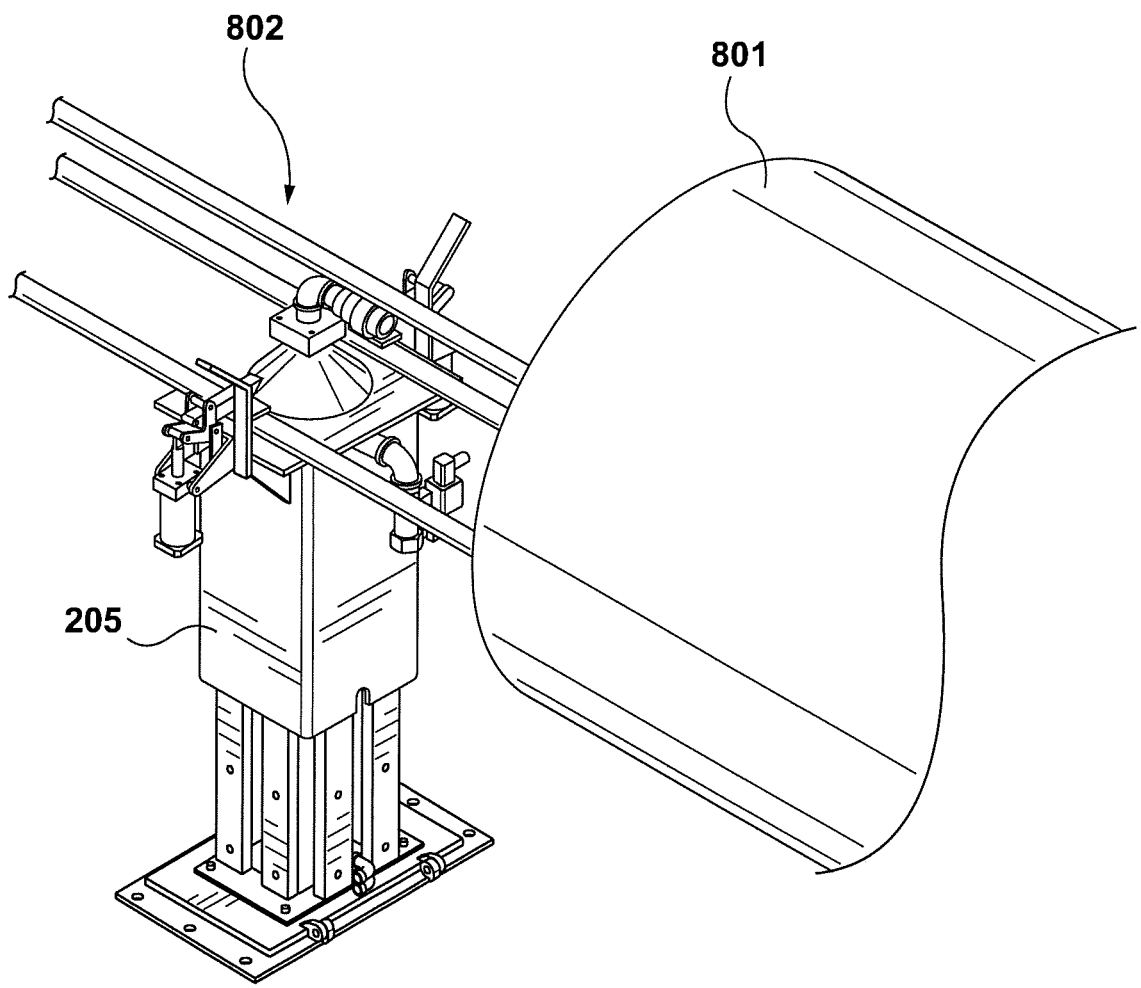
FIG. 8 is a perspective view of a retractable support supporting an internal quench lance after the pipe has passed the retractable support.

FIG. 8 shows that after the pipe 801 has passed the retractable support 205, the retractable support 205 extends to engage the internal quench lance 802, and the clamping process repeats to secure the retractable support 205 to the internal quench lance 802.

Figure 9:
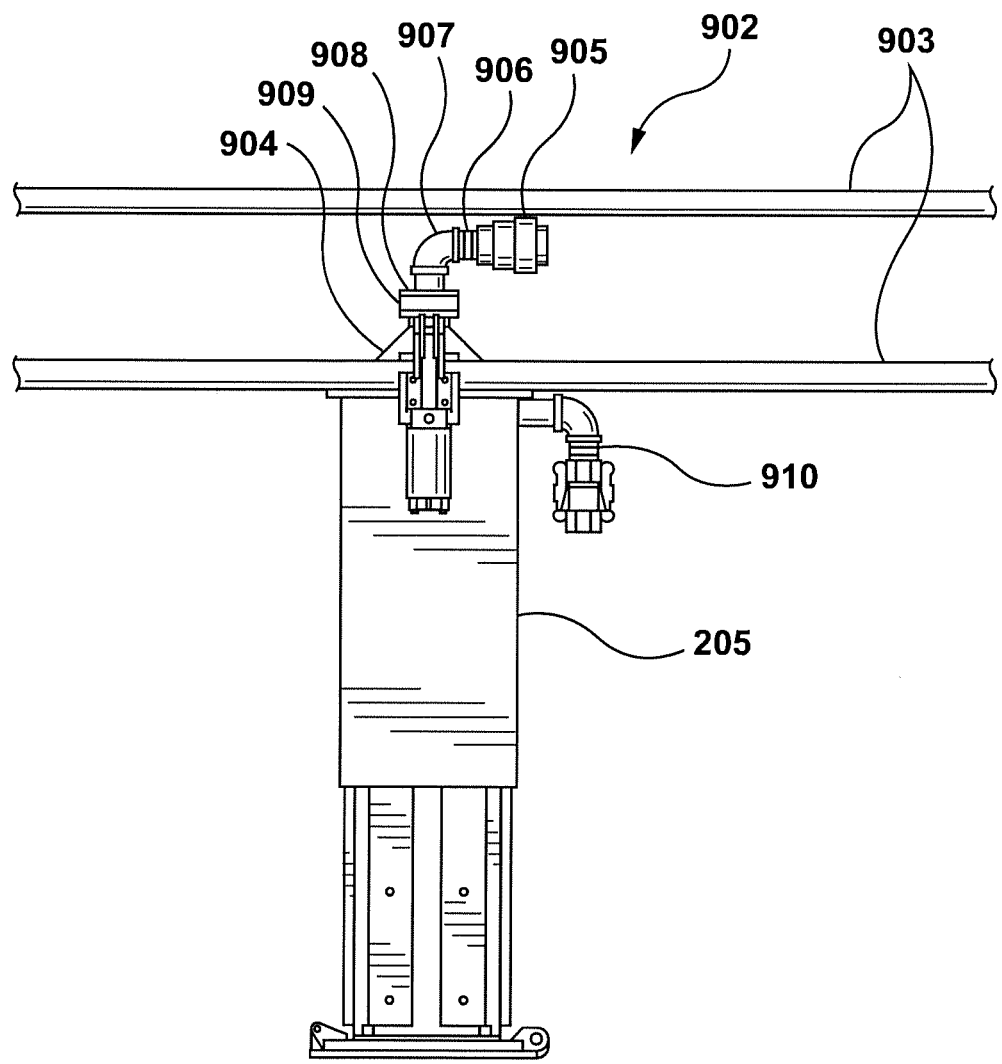
FIG. 9 is a side view of a retractable support connected to an internal quench lance.

FIG. 9 shows a side view of a retractable support 205 connected to an internal quench lance 902, comprising rods 903. The retractable support 205 is provided with a mechanism 910 to receive liquid coolant from a source. The mechanism 910 may be a pipe. In preferred embodiments, the mechanism 910 is rigid. In some embodiments, the mechanism 910 may be provided with a valve. In some examples, the valve is a check valve. In some embodiments, the mechanism 910 is provided with a clamping means to securely connect to a water source. In some embodiments, the rods 903 are conduits having spray nozzles. In some embodiments, the rods 903 are structural elements similar to those shown in FIGS. 2D and 2E, having conduit(s) with spray nozzles disposed within the space defined by the rods 903. In some embodiments, the rods 903 are conduits having spray nozzles, and conduit(s) are disposed within the space defined by the rods 903.

Mechanism is configured on the receptacle 904 to transport the liquid coolant to the spray nozzles to cool the coated pipes. The liquid coolant may be transported from the receptacle 904 by any suitable means known in the field. For example, there may be a water hose (not shown) that connects the receptacles 904 to the conduits. In some embodiments, the mechanism comprises a connecting plate 908 that connects the receptacle 904 and a 90° elbow 907, and the two connections are sealed by a rubber seal 908. The 90° elbow 907 is then connected to a close nipple 906 that connects to a valve 905. The valve 905 is preferably a check valve, which allows water to be forced into the lance water hose when the clamping mechanism is connected and prevents water from flowing out again when one retractable support 205 is lowered and another retractable support 205 is supplying water.

The embodiments of the present disclosure described above are intended to be examples only. The present disclosure may be embodied in other specific forms. Alterations, modifications and variations to the disclosure may be made without departing from the intended scope of the present disclosure. While the system, devices and processes disclosed and shown herein may comprise a specific number of elements/components, the systems, devices and assemblies could be modified to include addition or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and subranges within disclosed ranges are also disclosed. The subject matter described herein intends to cover and embrace all suitable changes in technology. All references mentioned are hereby incorporated by reference in their entirety.

The invention claimed is:

1. An internal quench system for cooling at least one pipe being coated, comprising: an internal quench lance, said internal quench lance extends longitudinally into an interior of the at least one pipe being coated; said internal quench lance having a plurality of spray nozzles at an end of the internal quench lance; said internal quench system further comprising a plurality of connectors for receiving liquid coolant; a plurality of retractable supports for supporting the internal quench lance, wherein two or more of the plurality of retractable supports are able to extend or retract in a vertical direction where one end of each of the two or more of the plurality of retractable supports are fixed to the ground, wherein each of the two or more of the plurality of retractable support is configured with a liquid coolant supplying means for connecting with the connectors to supply the liquid coolant to the internal quench lance and said each of the two or more of the plurality of retractable supports is able to be located directly under the pipe being coated or engaged with the internal quench lance, wherein said internal quench lance is supported directly by at least one of the plurality of retractable supports.

2. The internal quench system of claim 1, wherein the internal quench lance comprises a plurality of conduits.

3. The internal quench system of claim 2, wherein each conduit comprising a section configured with a plurality of spray nozzles.

4. The internal quench system of claim 3, wherein conveyor sections are offset from each other along the lengths of the conduits with the retractable supports located between conveyor sections.

5. The internal quench system of claim 1, wherein a valve is configured in the liquid coolant supplying means.

6. The internal quench system of claim 5, wherein the valve is a solenoid valve.

7. The internal quench system of claim 1, wherein an actuated valve and a check valve is configured in the connectors or the liquid coolant supplying means.

8. The internal quench system of claim 7, wherein the actuated valve is programmed to open when the internal quench lance and at least one of the plurality retractable supports is engaged.

9. The internal quench system of claim 1, wherein at least one of the plurality retractable supports is provided with at least one clamping mechanism.

10. The internal quench system of claim 9, wherein the at least one clamping mechanism is driven by at least one power source.

11. The internal quench system of claim 1, wherein the internal quench lance also comprises wheels disposed along the length of the internal quench lance, said wheels configured to be in contact with the inner surface of the at least one pipe when the internal quench lance is inside the at least one pipe and providing support to the internal quench lance when the wheels are inside the at least one pipe.

12. The internal quench system of claim 1, wherein at least one of the plurality retractable supports are disposed along the length of the internal quench lance.

* * * * *